United States Patent [19]

Stoot

[11] 4,188,141
[45] Feb. 12, 1980

[54] BUTT HOOK FOR A LOGGING CHOKER LINE

[76] Inventor: Robert C. Stoot, 3609 E. 17th Ave., Eugene, Oreg. 97403

[21] Appl. No.: 932,030

[22] Filed: Aug. 8, 1978

[51] Int. Cl.² ............................................. F16D 1/12
[52] U.S. Cl. ..................................... 403/24; 403/317; 294/91
[58] Field of Search .................. 403/24, 164, 165, 353, 403/331, 317, 316; 294/91; 59/95, 86

[56] References Cited

U.S. PATENT DOCUMENTS

| | | | |
|---|---|---|---|
| 243,859 | 8/1881 | Cushing | 294/91 X |
| 1,106,130 | 8/1914 | Clinger | 294/91 |
| 1,267,430 | 5/1918 | McConnell | 403/164 X |
| 1,653,092 | 12/1927 | Draper | 403/353 |
| 1,786,081 | 12/1930 | Nourse | 403/165 |
| 3,332,163 | 7/1967 | Stewart et al. | 403/353 X |
| 3,464,093 | 9/1969 | Laharty | 403/353 X |
| 3,492,033 | 1/1970 | Mueller | 59/95 X |
| 4,058,339 | 11/1977 | Burchard, Jr. | 403/331 X |

Primary Examiner—Andrew V. Kundrat
Attorney, Agent, or Firm—James D. Givnan, Jr.

[57] ABSTRACT

A butt hook having a main body defining a laterally open cavity within which is received a choker line ferrule. A sleeve on the main body is positionable therealong to open and close the cavity for release and retention of the ferrule. A winchline receiving, removable shackle on the main body confines the sleeve against opening movement to assure ferrule and choker line retention. The shackle is of the type manually removable enabling choker line detachment and replacement without the aid of tools. A modified form of butt hook utilizes a sleeve of reduced length slidably mounted on the main body to open and close a ferrule receiving cavity. A key on the main body prevents axial movement of the sleeve until a keyway in the sleeve is rotated into alignment with the key to permit axial sleeve movement.

4 Claims, 6 Drawing Figures

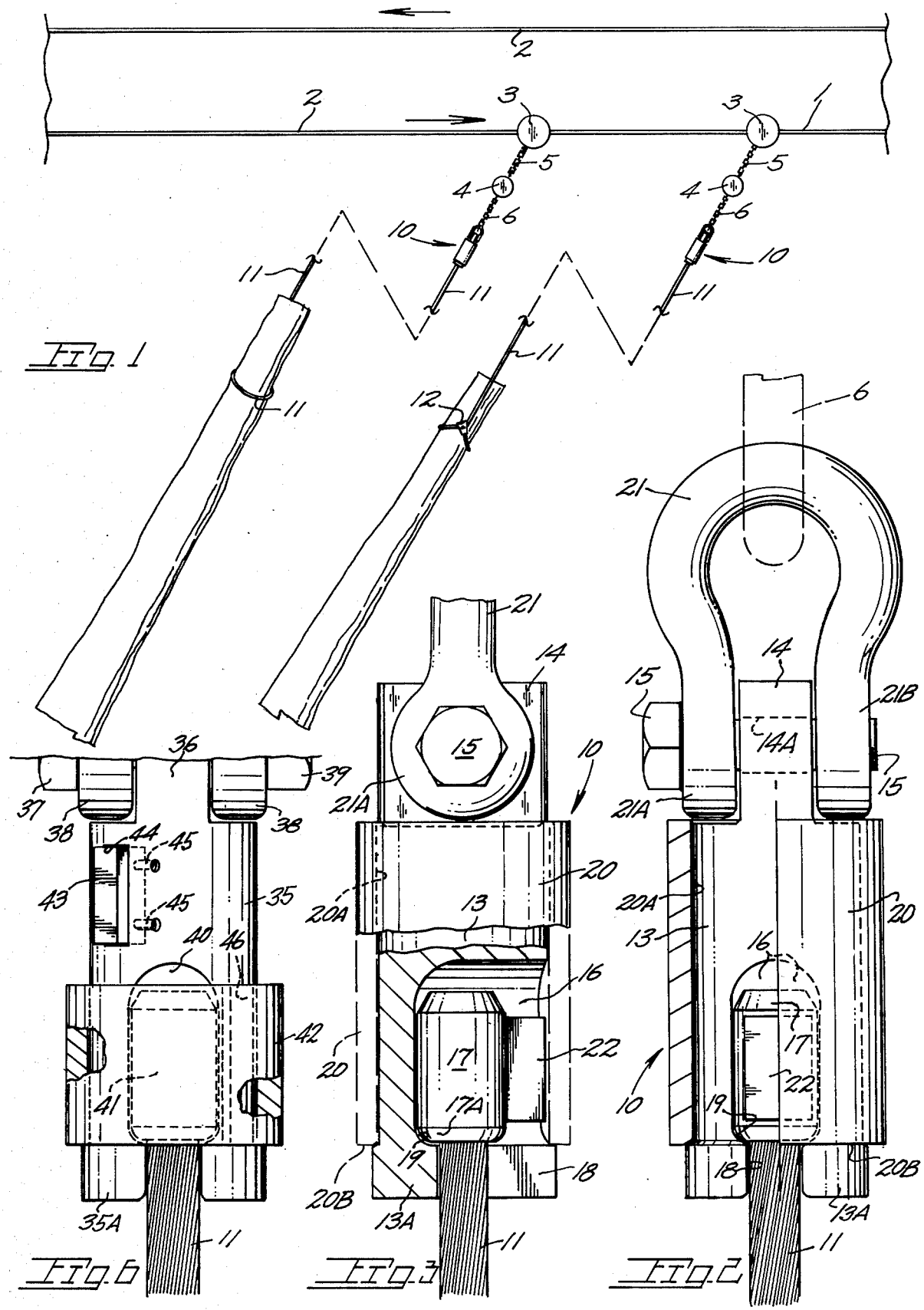

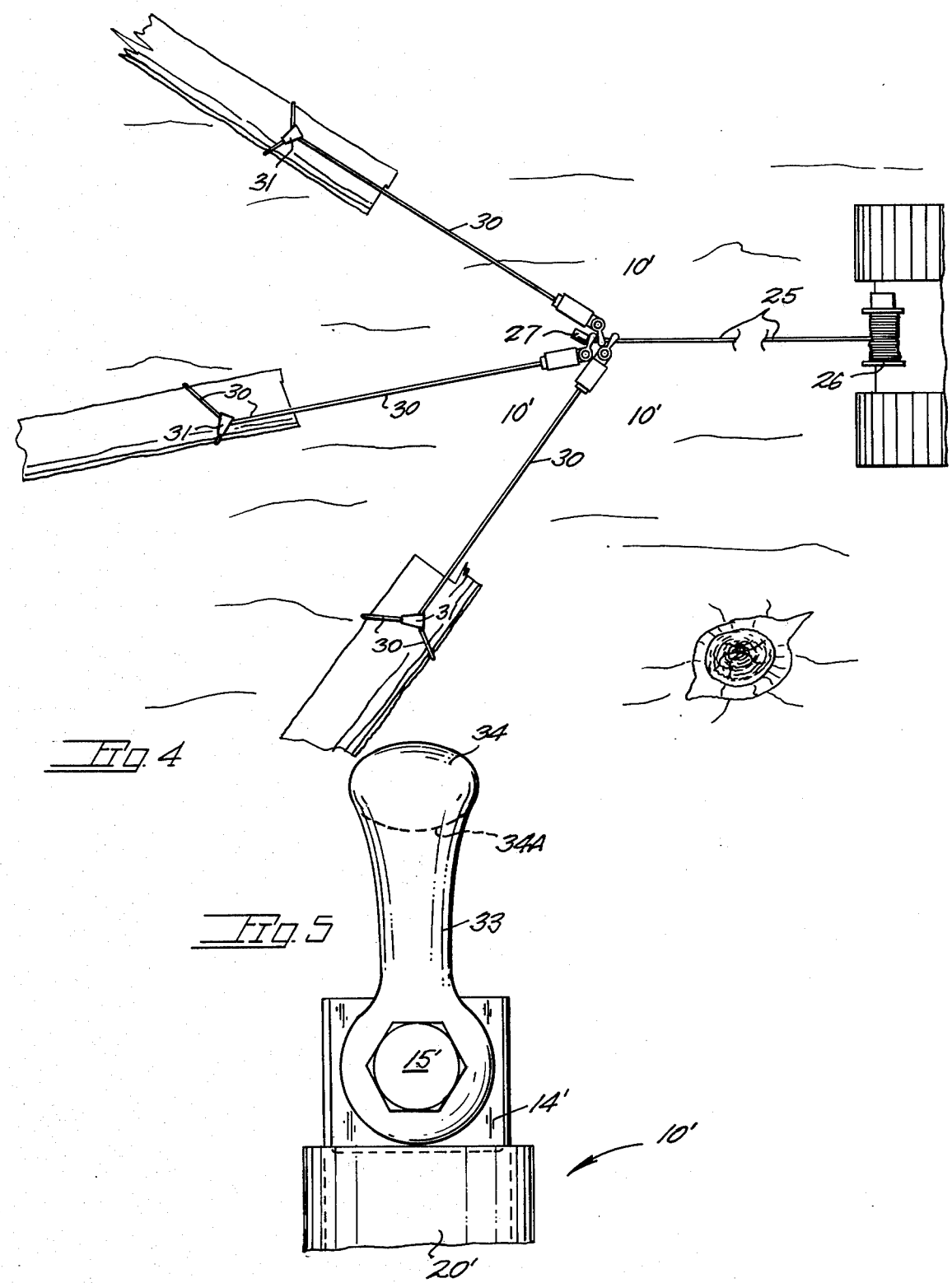

BUTT HOOK FOR A LOGGING CHOKER LINE

BACKGROUND OF THE INVENTION

The present invention concerns rigging for logging operations and particularly a butt hook for receiving the ferrule equipped leading end of a log engaging choker line.

A choker line or cable is typically passed about an end segment of a felled log for purposes of transporting same to a site whereat the logs collected are loaded for travel to a mill or storage area. The log encompassing end of the line is fitted with a ferrule for removable securement within a choker hook with the line passing about the log, back through the choker hook and thence upwardly to a butt hook. The butt hook may travel off the ground as in a high lead logging operation, or in the case of log skidding, may be pulled over the terrain. The choker line is also ferrule equipped at the butt hook attaching end enabling convenient removal for line replacement or reversal as is often necessary by reason of kinked or damaged cables.

In logging operations butt hooks are subjected to severe impacts particularly when in an unloaded or slacked condition during dragging back to the log pick up site. Random bouncing of the butt hook can cause unseating of the choker ferrule therein with resultant choker loss. U.S. Pat. No. 3,464,093 was directed toward overcoming this problem and envisioned the use of flexible projections to confine the ferrule against all but intentional removal.

Ideally a ferrule should be positively locked in place within a butt hook yet readily removable for choker line reversal or replacement. No such butt hook has been heretofore available which entirely satisfies these requirements. Further, known butt hooks for high lead logging have not been interchangeable with butt hooks used in a log skidding operation.

SUMMARY OF THE PRESENT INVENTION

The present invention is embodied within a butt hook receiving a choker ferrule in a positively locked manner as opposed to known one piece cast butt hooks. The present butt hook includes a main body portion of elongate configuration having a cavity for lateral insertion and removal of the choker attached ferrule. A sleeve encompasses said hook body to retain the ferrule in place yet permits ferrule and hence choker detachment in an expeditious manner upon sleeve repositioning. Said sleeve is held against movement relative the hook body by attachment means shown and described as a shackle while sleeve movement in an opposite direction is prevented by contact with the hook body. The base portion of the hook body has a radially directed slot for reception of that segment of the cable adjacent the ferrule.

A modified form of the invention includes the foregoing structure and additionally the main body of the hook is provided with locking means preventing accidental ferrule releasing movement of the sleeve in an axial direction during hook use.

The butt hook embodying the present invention may be advantageously used in different types of logging operations, for example, high lead logging or log skidding operations and in both instances serves to removably attach the leading end of a choker line with a winchline or winchline suspended components. As above noted, butt hooks are subjected to severe impacts against trees, logs, stumps, etc., during use with the choker ferrule held therein being subject to dislodgment particularly during return of a rapidly moving, unloaded butt hook to the log pick up site. Accordingly, it is highly desirable to provide a butt hook which positively locks the ferrule in place therewithin yet permits a worker, at the log pick up site, to remove same and the choker line with no or a minimum of tools for choker replacement or reversal as oftimes becomes necessary by reason of kinked cable segments.

Important objectives of the present butt hook include the provision of a butt hook wherein a choker cable ferrule is confined within a main body of the hook by a sleeve the latter being locked against axial movement relative the body; the provision of a butt hook not dependent upon frictional engagement of the ferrule within butt hook socket walls for ferrule retention; the provision of a butt hook wherein attachment means on the hook prevents sleeve movement to a ferrule releasing position; the provision of a butt hook wherein said main body carries locking means restricting the sleeve on said body against movement to a ferrule releasing position; the provision of a butt hook wherein attachment means carried by the butt hook main body comprises a shackle having an enlarged bail portion preventing cable damage, and; the provision of a butt hook of lighter weight than known butt hooks to permit increased log "payloads".

BRIEF DESCRIPTION OF THE DRAWINGS

In the accompanying drawings:

FIG. 1 is an elevational view of the present butt hook in use suspended from a winchline of logging rigging;

FIG. 2 is an elevational view of the butt hook on a reduced scale with the sleeve thereof broken away along a sleeve radial plane for purposes of illustration;

FIG. 3 is a view similar to FIG. 2 with the butt hook rotated through 90 degrees and with fragments of the sleeve and main body broken away for purposes of illustration.

FIG. 4 is a plan view of a log skidding operation utilizing the present butt hook;

FIG. 5 is a side elevational view of the upper end of the present butt hook provided with a shackle adapted for use in a log skidding operation;

FIG. 6 is an elevational view of a modified form of butt hook including sleeve locking means in place on the main body of the butt hook.

DETAILED DESCRIPTION OF THE PREFERRED EMBODIMENTS

With continuing attention to the accompanying drawings, the reference numeral 1 indicates the in-haul winchline of logging rigging which includes a line 2 reversed about a block (not shown) for return and attachment to in-haul line 1 and specifically mainline swivels thereon indicated at 3. Each main line swivel 3 and its butt hook swivel indicated at 4 are interconnected by a butt chain 5 while a second section of chain 6 extends from the butt swivel for butt hook attachment. The unseen right hand ends of lines 1 and 2 are wound about a powered drum or drums of a yarder. The foregoing is intended to describe a typical high lead logging operation with which the present hook is usable but not restrictively so.

The present butt hook is indicated generally at 10 shown carrying one end of a conventional choker line 11 typically fitted with a ferrule in place within the butt hook. The remaining end of the choker line passes about a log end with a second end mounted ferrule being inserted within a choker hook at 12. Such choker hooks are configured so as to retain the ferrule while permitting passage of the choker line as the line is snugged about the log during log retrieval.

With particular attention to FIGS. 2 and 3, a main body 13 of the butt hook is of elongate configuration terminating upwardly in a projection 14 apertured at 14A for the reception of a shackle bolt 15.

A cavity at 16 is formed within the lower portion of main body 13 with internal body wall surfaces defining the laterally directed cavity. Said cavity is of a height and width to receive a ferrule 17 secured to the leading end of choker line 11. A lowermost portion 13A of the main body defines a laterally directed opening 18 which terminates inwardly in coaxial relationship with cavity 16. As best chown in FIG. 2, an internal rounded shoulder 19 is formed on a radius complementary to that radius of a ferrule end indicated at 17A. Accordingly, ferrule 17 is supported against all cable exerted loads. Cavity 16 is formed so as to locate ferrule 17 concentric with the major axis of the main body.

Disposed on main body 13 is a sleeve 20 having an inner wall surface 20A the sleeve being in sliding contact with the exterior of the main body. An end 20B of the sleeve contacts the lowermost portion 13A of the main body to restrict sleeve movement in one direction.

A shackle 21 constituting attachment means is attached to projection 14 by shackle bolt 15 with shackle ends 21A-21B serving to confine sleeve 20 against axial movement in the remaining direction. Bolt 15 is in threaded engagement with shackle end 21B so as to be retained against shackle separation. If so desired, shackle bolt 15 may receive a self-locking nut in which instance threading of shackle end 21B is dispensed with. In either case shackle bolt 15 may be easily removed, such an operation requiring at most a wrench and, in the first described arrangement, being manually removable if finger tightened.

For retention of choker line 11 and its ferrule 17 substantially concentric with main body 13, a spacer 22 is confined intermediate the ferrule end internal sleeve surface 20A.

With attention now to FIG. 4, a typical log skidding operation is disclosed in plan view wherein a winchline 25 is powered by a tractor mounted winch 26 the latter having an elevated fairlead so as to customarily elevate the forwardmost ends of the logs being skidded ground obstruction avoidance. A ferrule 27 on the winchline end serves as a stop against which the shackle of a butt hook and successive butt hooks may be retained during log skidding. Choker lines are indicated at 30 terminating outwardly in attachment with choker hooks 31 in the above described manner. The present butt hook is indicated generally at 10' and corresponds to the butt hook earlier described but which preferably includes a somewhat modified shackle 33 as best shown in FIG. 5. Remaining butt hook parts are identified with like prime reference numerals. For purposes of avoiding damage to winchline 25, the shackle 33 is formed with a bail 34 of oval cross section providing an increased surface 34A. The foregoing is advantageous in a log skidding operation by reason of the fact that the winchline passing through the butt hook shackles is subjected to fraying by severe loads exerted in opposite directions within a short distance. The increased surface area 34A of the shackle is desirable by reason of such loads being borne by a larger surface area than would occur with a conventional shackle.

A modified form of butt hook is shown in FIG. 6 and includes a main body 35 having an upward projection 36 for reception of a shackle attaching bolt 37 passing through shackle ends 38 to receive a nut 39. Main body 35 defines a ferrule receiving cavity 40 of the size and configuration earlier described in the first form of the invention. A ferrule 41 is retained within cavity 40 by a sleeve 42 of reduced length attached for limited sliding movement along main body 35. Remaining butt hook structure is as earlier set forth with differences noted as follows.

Locking means indicated at 43 comprises a key secured within a main body recess 44 as by set screws 45. Sleeve 42 includes a lengthwise extending keyway or channel 46 of a sectional area adequate to slidably receive key 43 when aligned therewith. During a logging operation sleeve 42 gravitates toward the lowermost end 35A of the main body to confine ferrule 41 within cavity 40. Inadvertent alignment of sleeve channel 46 with key 43 coincident with sleeve upward movement is virtually non-existant to preclude accidental choker line separation. In this form of the invention, the shackle need not be removed for ferrule removal. Only upon alignment of channel 46 with key 43 and careful engagement of the sleeve with said insert can cavity 40 be opened for ferrule release.

Use of the present butt hook is believed obvious from the foregoing description.

While I have shown but a few embodiments of the invention, it will be apparent to those skilled in the art that the invention may be embodied still otherwise without departing from the spirit and scope of the invention.

Having thus described the invention, what is desired to be secured under a Letters Patent is:

1. A butt hook for reception of a choker line ferrule, said butt hook serving to couple the log engaged choker line to a winch retrieved line, said butt hook comprising, a main body defining a laterally opening cavity for reception of the choker line ferrule, said main body also defining a radially directed opening at one end for lateral passage of that portion of the choker line adjacent the ferrule, a sleeve on said main body and adapted for limited axial movement therealong to open and close said cavity, shackle means removably attached to the remaining end of said main body and adapted to receive the winch retrieved line, said shackle means having aligned ends proximate a sleeve end and normally preventing cavity opening movement of said sleeve in one direction, said main body restricting sleeve movement in an opposite direction, and said sleeve axially positionable upon removal of said shackle means from said body to provide ingress and egress of the ferrule.

2. The butt hook claimed in claim 1 additionally including a spacer interposed between the ferrule and said sleeve.

3. A butt hook for reception of a choker line ferrule said butt hook serving to couple the choker line to a winch retrieved line, said butt hook comprising, a main body defining a laterally opening cavity for reception of the choker line ferrule, said body also defining a radially directed opening for lateral passage of that portion of the choker line adjacent the ferrule, a sleeve on said main body and adapted for rotational positioning about said main body and for limited axial movement therealong to open and close said cavity, said sleeve having an internal channel formed therealong, said main body restricting sleeve movement in one direction, shackle means attached to said main body and adapted to receive the winch retrieved line, locking means on said main body normally projecting outwardly into the path of said sleeve to confine same against cavity opening axial movement, said sleeve channel of a size permitting reception of the locking means upon alignment therewith allowing subsequent axial positioning of the sleeve to open said cavity, and said shackle means having aligned ends proximate a sleeve end to prevent sleeve cavity opening movement along said main body.

4. The butt hook claimed in claim 3 additionally including a spacer interposed between the ferrule and said sleeve.

* * * * *

UNITED STATES PATENT OFFICE
CERTIFICATE OF CORRECTION

Patent No. 4,188,141　　　　　　　　　　Dated February 12, 1980

Inventor(s)　　Robert C. Stott

It is certified that error appears in the above-identified patent and that said Letters Patent are hereby corrected as shown below:

In the patent heading, change the name "Stoot" to - - - Stott - - -. Further, after "Inventor", change "Robert C. Stoot" to - - - Robert C. Stott - - -.

Signed and Sealed this

Seventeenth Day of June 1980

[SEAL]

Attest:

SIDNEY A. DIAMOND

Attesting Officer　　　Commissioner of Patents and Trademarks